United States Patent

Shinomura

[11] Patent Number: 5,935,228
[45] Date of Patent: Aug. 10, 1999

[54] METHOD FOR AUTOMATICALLY ENABLING PERIPHERAL DEVICES AND A STORAGE MEDIUM FOR STORING AUTOMATIC ENABLE PROGRAM FOR PERIPHERAL DEVICES

[75] Inventor: Masahiko Shinomura, Machida, Japan

[73] Assignee: International Business Machines Corporation, Armonk, N.Y.

[21] Appl. No.: 08/829,561

[22] Filed: Mar. 28, 1997

[30] Foreign Application Priority Data

Apr. 26, 1996 [JP] Japan ................................ 8-106652

[51] Int. Cl.⁶ .................................................. G06F 13/00
[52] U.S. Cl. ......................... 710/102; 710/101; 709/301; 713/2; 713/100
[58] Field of Search ..................... 395/281–283, 395/306, 308, 311, 285, 828, 830, 831, 833, 836, 652, 882–883, 527, 651, 681

[56] References Cited

U.S. PATENT DOCUMENTS

| | | | |
|---|---|---|---|
| 5,630,174 | 5/1997 | Stone, III et al. | 395/883 |
| 5,671,368 | 9/1997 | Chan et al. | 395/282 |
| 5,689,710 | 11/1997 | Stanley et al. | 395/701 |
| 5,708,799 | 1/1998 | Gafken et al. | 395/500 |
| 5,710,941 | 1/1998 | Parry | 395/834 |
| 5,748,913 | 5/1998 | Shibahara | 395/282 |
| 5,787,246 | 7/1998 | Lichtman et al. | 395/200.5 |
| 5,802,365 | 9/1998 | Kathail et al. | 395/681 |

Primary Examiner—Ayaz R. Sheikh
Assistant Examiner—Raymond N Phan
Attorney, Agent, or Firm—Casimer K. Salys

[57] ABSTRACT

A superior method for automatically enabling a PC card whereby, when a PC card that can be driven only by a DOS/Windows 3.x device driver is inserted, the PC card is enabled by that device driver, and whereby, when a PC card is inserted that can be driven by a Windows 95 native mode device driver, the PC card is enabled by that device driver. In one form the invention is directed to a method, for automatically enabling a PC card, that can be applied to an information processing system that is controlled by an operating system having either a 32-bit mode or a 16-bit mode, and that have a plurality of device drivers for both a 32-bit mode and a 16-bit mode, comprises the steps of: (a) detecting an insertion event when a PC card is inserted into the information processing system; (b) giving priority, in response to the insertion event, to the device driver of the 16-bit mode in enabling the PC card; and (c) giving chance, in response to the insertion event, to the device driver of the 32-bit mode in enabling the PC card if the PC card is not enabled by the device driver of the 16-bit mode. In another form the invention is directed to a computer implemented program operable to practice the aforementioned method.

15 Claims, 10 Drawing Sheets

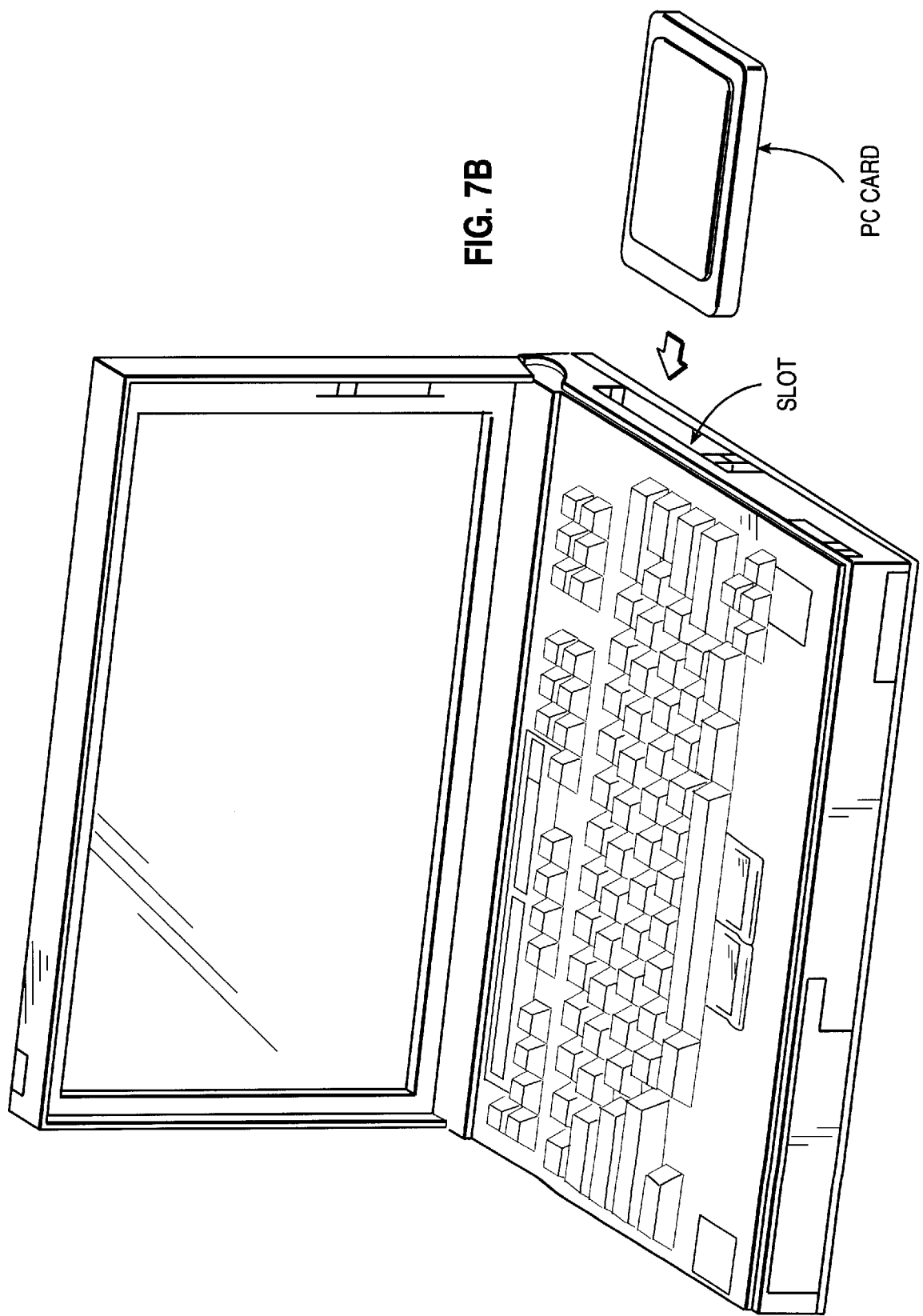

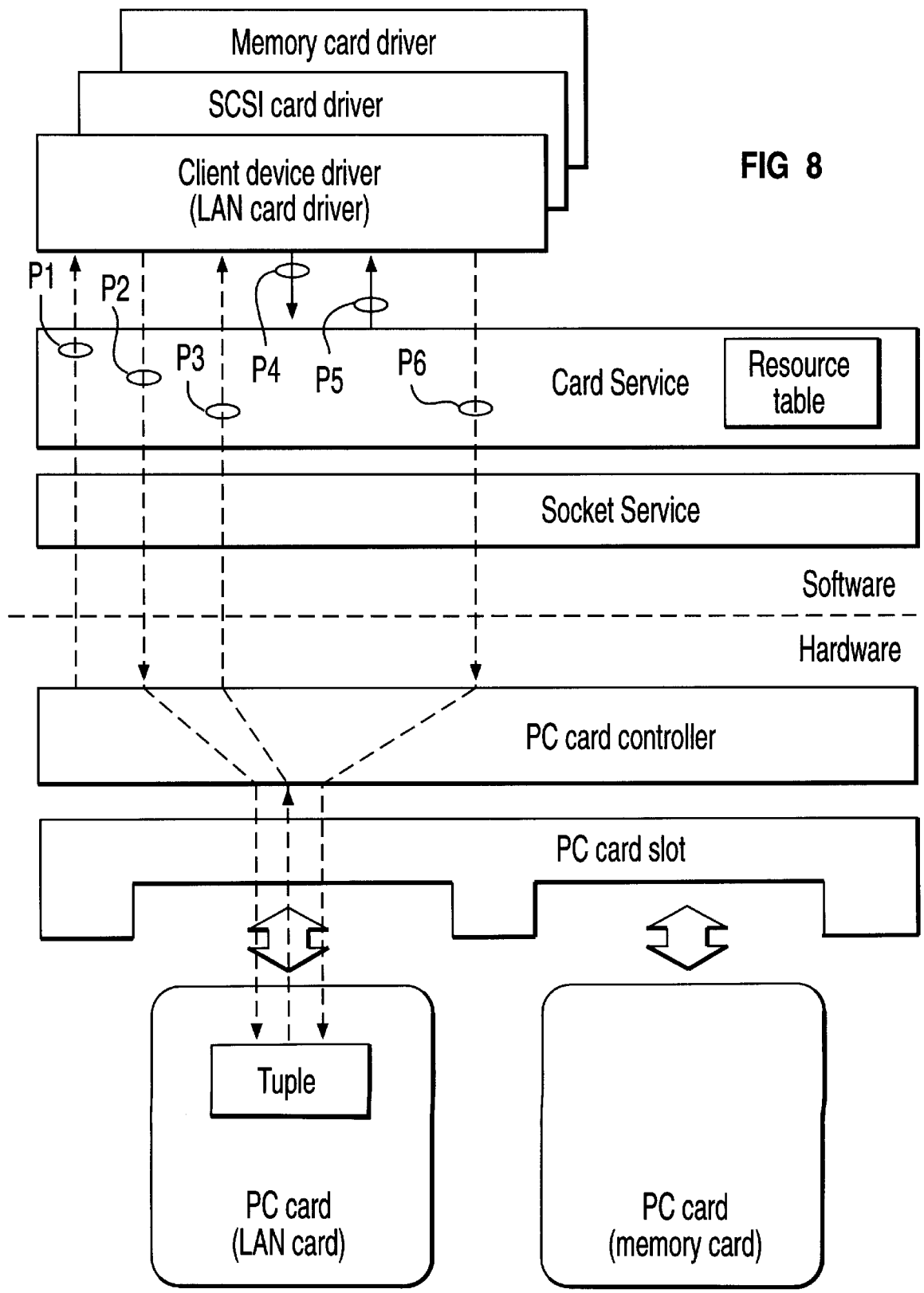

METHOD FOR AUTOMATICALLY ENABLING PERIPHERAL DEVICES AND A STORAGE MEDIUM FOR STORING AUTOMATIC ENABLE PROGRAM FOR PERIPHERAL DEVICES

FIELD OF THE INVENTION

The present invention relates to information processing systems, including personal computers, and in particular to information processing systems that have peripheral devices, such as PC cards, as standard features, or have such devices connected externally and detachably, and that drive the peripheral devices using corresponding device drivers. More specifically, the present invention pertains to an automatic enabling method that can be applied for such information processing systems to automatically enable/disable peripheral devices that are newly attached to or detached from the systems, and to computer programmable memory media in which are physically stored computer programs for implementing automatic enabling processes for the peripheral devices.

DESCRIPTION OF THE BACKGROUND

In accordance with recent technical developments, various types of personal computers (PCs), such as desktop and notebook computers, are being produced and sold. When shipped, the PCs may be equipped only with basic devices, such as CPUs and main memories, installed as standard features, but thereafter, end users can expand their capabilities by adding peripheral devices upon their individual needs. Generally, such a PC executes various computer processes under the control of basic software called an operating system (OS).

Conventionally, one can expand the capability of a PC by inserting a peripheral device called an "expansion adaptor card" into a bus slot that is provided on the PC (see FIG. 7(a)). Video adaptors, communication adaptors, expansion memories, SCSIs (Small Computer System Interfaces) are example of expansion adaptor cards.

The use of expansion adaptor cards to expand the system configurations has been especially effective for desktop computers. However, as notebook computers are designed to be small and compact, the attachment density in their main bodies is very high, and the number of bus slots provided and the space available for media storage are extremely limited. In other words, the possible expansion of the system configuration of a notebook computer by using an expansion adaptor card is limited.

A so-called PC card is a peripheral device, the size of a credit card, that has been developed to compensate for the limited configuration expansion of notebook computers. If a slot (a PC card slot) having a storage space for storing a PC card and a connector for electric connection to the PC card is provided in a notebook computer, the system configuration of the notebook computer is easily expanded (see FIG. 7(b)). The international standard guidelines concerning the mechanical and electric specifications for PC cards are determined by PCMCIA (Personal Computer Memory Card International Association) and JEIDA (Japan Electronic Industry Development Association). At present, three types of PC cards are being shipped: Type I, which is 3.3 mm thick; Type II, which is 5.5 mm thick; and Type III, which is 10.5 mm thick. Type I is used mainly as a memory card. Type II is employed for the use as a facsimile/modem, an Ethernet adaptor, and a SCSI adaptor. Type III is used mainly as a hard disk incorporated card. Recently, since the selection of available PC cards is larger and their prices are lower, PC card slots are not only being provided for notebook computers but also for desktop computers. Following the U.S. government announcement that one of its procurement standards is "the equipping of all desktop computers with PC card slots", the spread of PC cards has accelerated.

The main feature of PC cards is that they can be frequently inserted into and removed from the system. This feature is important for the following reasons: the needs of users vary; the required devices for portable PCs, such as notebook computers, change in accordance with the locations in which they are used; the number of card slots with which a PC can be equipped is limited. The original premise on which the design of PC cards is based is that the cards would not be fixed to the main body of a PC like an expansion adaptor. A form factor, in this case, is that the shape and the design of a cartridge are based on the ease with which the cartridge can be attached/detached. PC cards can also be actively inserted/removed (hot-plugged in/out).

When a system configuration is changed due to the inserting/removing of a PC card, the PC main body (hereinafter also referred to as a "system") must re-allocate system resources. The system resources here are, for example, I/O addresses, memory addresses, DMA (Direct Memory Access) channels, and IRQ (Interrupt request) channels. A CPU accesses a peripheral device in accordance with the I/O addresses assigned to it. A peripheral device can issue a request or transmit responses to the CPU in accordance with the DMA channel or the IRQ channel that are reserved for it. The host PC, therefore, must so allocate its system resources that no resource conflicts arise among the peripheral devices. Since the system resources are limited (for example, for an ISA (Industry Standard Architecture) system, only eight DMA channels and 16 IRQ channels are provided), they should be distributed effectively. For example, a system resource allocated for a peripheral device that has been removed and is no longer a part of the system configuration should be promptly released, and an IRQ channel should not be reserved for a peripheral device that does not use one any more. In order to effectively utilize PC cards, re-allocation of system resources must be dynamically and efficiently performed.

Conventional peripheral device employ jumper or DIP switches to define the system resources that it uses. Since common users find it difficult to manipulate jumper or DIP switches without causing system resource conflicts among peripheral devices, Microsoft Corp. and Intel Corp. have developed the "Plug&Play" specification (hereinafter referred to as "PnP") for automatically altering system environments, including the allocation of system resources, in accordance with the plugging in and the plugging out of peripheral devices. With PnP, even when a peripheral device is actively inserted or removed while a system is in operation, the system resources are dynamically allocated or are released, and when a system resource conflict arises, it is automatically resolved. In other words, with PnP, the system performs peripheral device setups which user had done manually.

Among the interfaces used by PC, the standardized specification for the PC card, that was developed by PCMCIA/JEIDA, supported PnP from earlier time. When a PC card is inserted into a system, the system automatically recognizes the PC card, and PC card software ("Card Service" and "Socket Service" that will be described later) automatically assigns system resources to the PC card and configures it for the system. As a result, neither jumper nor DIP switches are required for PC cards.

The PnP mechanism for a PC card will now be described while referring to FIG. 8.

In the DOS (Disk Operating System; Windows 3.1 is included, the reference hereinafter being expressed as "DOS/Windows 3.x") environment, the PC card PnP is implemented with the help of two kind of device drivers for PC cards. One is a "Socket Service", and another is "Card Service". The Socket Service and the Card Service constitute important software layers by which DOS can identify PC cards. These layers are required for all types of PC cards. In the upper of the two software layers is a individual device driver (client driver) for a PC card required for the driving of the corresponding PC card.

The Socket Service is a software layer for providing an abstract representation of a hardware PC card controller, and includes a function call for directly controlling the PC card controller. The upper software layer can communicate with the hardware via the Socket Service.

The Card Service is a software layer for managing the system resources of a PC card inserted into a card slot. The Card Service includes a function call for the Socket Service and provides a programming interface (PI) for the upper device driver (client device driver) registered as a client in the Card Service.

The client device driver is a device driver for a individual PC card, i.e., a dedicated device driver prepared only for a corresponding PC card. Example client device drivers are a LAN card driver for a LAN card, a memory card driver for a memory card, and a SCSI card driver for a SCSI card. By performing client registration to the Card Service, these client device drivers can be informed of an event, such as the insertion and removal of a PC card, and can also request the Card Service allocate/release system resources, and start/stop the power supply to the corresponding PC card. It should be noted that, in order to support the PnP function, the client device driver should be loaded by the system in advance and registered as a client in the card service.

When, for example, a PC card is inserted into a slot in the DOS/Windows 3.x environment, the Socket Service and the Card Service identify the card insertion event through the PC card controller. Then, the Card Service reports the event to the client device drivers that are registered as a client of the Card Service (arrow P1 in FIG. 8). Upon the receipt of the notification of the event, the client device drivers sequentially read attribute information (also called a tuple) from the memory in the PC card (arrows P2 and P3 in FIG. 8). A client device driver, which ascertains by referring to the tuple that it is the driver corresponding to the inserted PC card, learns, from the contents of the tuple, the system configuration required for the PC card, and forwards a request to the Card Service for the assignment of a system resource (arrow P4). When the Card Service finds an available system resource, writes it into a resource table in the Card Service, and permits the client device driver to use the system resource (arrow P5). Then, the client device driver programs the PC card controller via the Card Service and the Socket Service (arrow P6), and install the PC card in the system configuration. The client device driver then requests the PC card controller to power the slot. As a result, the PC card is activated as part of the system.

The Socket Service and the Card Service are already standardized by the PCMCIA following the Rel 2.1 (or the JEIDA following the Ver 4.2). The Socket Service and the Card Service, which may be regarded as device drivers for a PC card slot, are software for accessing a PC card slot. It should be noted that PC card control software, such as the Socket Service and the Card Service, are not standard features of conventional DOS. Therefore, generally, these two device driver layers are provided by PC card software makers other than the makers of OSs. For example, "PlayAtWill" ("PlayAtWill" is a trademark of IBM Corp.), sold by IBM Japan, Ltd., is a software product package that includes the Socket Service and the Card Service.

An operating system (OS) is, as is known, basic software for the general management of PC hardware and software. In general, an OS includes a "file manager", for managing the writing and the reading of files relative to an auxiliary storage device, such as a hard disk drive (HDD); a "memory manager", for managing memory space; and a "scheduler", for managing task execution priorities. In addition, included in an OS is a "user interface" for handling a screen display, command input and the operation of a mouse.

One example of a recent OS is "Windows 95", released by MicroSoft Corp. in 1995. Windows 95 is a "32-bit OS" that can operate in a 32-bit address space provided by a CPU having a 32-bit architecture (e.g., 80486SX by Intel Corp. or higher). The conventional DOS/Windows 3.x is a "16-bit OS" that operates in a 16-bit address space provided by a CPU having a 16-bit architecture (e.g., 80386 by Intel Corp.). Windows 95 is a high-performance OS that can fetch and process data for the CPU twice as fast as the DOS/Windows 3.x. Windows 95 also includes a 16-bit compatible mode in order to ensure compatibility with applications prepared for DOS/Windows 3.x. It should be noted, however, that when operating in the 16-bit compatible mode, since the 16-bit mode and the 32-bit mode are switched as necessary in the kernel (core) of the OS, the performance is inevitably reduced.

In one aspect, Windows 95 is designed for the integration of information processing apparatus (OA apparatus, communication apparatus, etc.). "Multitasking support" and "PnP support" is its main features. Windows 95 is designed to provide multitasking support because the parallel processing of a plurality of operations is the key to the connecting of information processors (for example, a telephone call or a facsimile communication can be accepted during the reproduction of a picture image, or an e-mail can be read on a display screen in the foreground while the database of a server is being accessed in the background). Further, Windows 95 is designed to provide PnP support because this reduces the cost of running a PC in the office. Since a greater variety of peripheral devices can be attached to a PC, and since the system configuration, although more complicated, is managed automatically, the running costs are reduced and the integration of a number of different types of information processing apparatuses can be performed.

In FIG. 9 is the PnP architecture of Windows 95. As is shown in FIG. 9, in Windows 95 a bus enumerator is provided for respective sub-systems (e.g., an ISA bus, a PCI (Peripheral Component Interconnect) bus, a SCSI (Small Computer System Interface) bus, and a PCMCIA bus), and a software layer called a "configuration manager" is provided at the upper level of the bus enumerators. For example, a PCMCIA bus enumerator includes a Socket Service and a Card Service that conform to the PCMCIA Rel 2.1, a common enabler for enabling a PC card, a device driver loader for automatically loading a client device driver, and a C/M interface for interacting with the configuration manager.

As there are many types of device drivers present in the OS, the system will not operate effectively in case resource conflicts arise among these drivers. In Windows 95, cooperation between the device drivers assigned to the separate buses is provided by using the bus enumerators, and the configuration manager manages the resources for the entire system. The PnP support is thus implemented. When, for example, a PC card is inserted into the card slot, first, the PC card is automatically identified locally via the PCMCIA bus enumerator, and system resources are assigned by the configuration manager so that they do not conflict with the other resources assigned to peripheral devices on the other buses. In this manner, the PC card is added to the configuration system.

In addition, the PnP function in Windows 95 not only performs the dynamic configuration of system resources but also performs the automatic loading of device drivers. For example, when a PC card is inserted into the system, the PCMCIA bus enumerator assigns a system resource to the PC card, and automatically loads an appropriate PC card device driver (client driver). This differs from the function provided by DOS/Windows 3.x, which is based on the client driver always being resident in the memory, and has the effect of reducing the memory space permitted for device drivers.

The PCMCIA/JEIDA, which are the PC card standardization associations, are preparing specifications that would keep up with the progress attained by host systems. The "PC card standard" released in 1995, for example, includes the "CardBus", which has a 32-bit bus master function for supporting a high-speed PCI (Peripheral Component Interconnect) bus. With the CardBus, a multimedia function, such as the fetching of high quality picture images, can be accomplished by a PC card.

On the other hand, multitasking and PnP support for the OS also have been studied with the primary aim being the integration of information processing apparatus. In Windows 95, the OS voluntarily manages hardware resources, and the Socket Service and the Card Service for automatically identifying PC cards, for example, are provided as standard features in Windows 95.

PC cards and OSs, however, are not always synchronously developed. This occurs for the simple reason that specifications for PC cards are standardized by the PCMCIA/JEIDA and the cards are developed by PC card venders, while OSs are developed by OS makers, such as Microsoft Corp. That is, the PC cards and the OSs are developed independently. A more specific example is the support provided for the "CardBus". Although Windows 95 was released in 1995 and its PCMCIA function, i.e. the Socket Service and Card Service attached thereto, is 32 bits wide, it just conforms to "PCMCIA Rel 2.1" (a specification issued for the prior generation) which was issued in 1993. More time will be required for the PCMCIA function of Windows 95 to be updated so that it conforms to the latest "CardBus" specification. On the other hand, in 1996 PC card makers shipped PC cards and device drivers that support CardBus, and this year PC makers also plan to ship PCs that are equipped to handle CardBus. But the CardBus device drivers that are supplied by PC card makers are generally still for 16 bits, and can not be used in the 32-bit mode of Windows 95. The CardBus device drivers are designed as 16-bit drivers, while Windows 95 does not support CardBus.

That is, a paradox situation has arisen because Windows 95 native mode device drivers can not handle PC cards conforming to the latest PCMCIA/JEIDA specification even though they are 32-bit, high-performance device drivers, while the device drivers supplied by PC card makers are only 16-bit drivers, i.e., for use in DOS/Windows 3.x, even though they can handle the latest type PC cards.

Thus, PC cards that support Cardbus can not be used in the Windows 95 native mode. If a user desires to use a CardBus PC card, he or she has no choice but to employ a 16-bit device driver intended for DOS/Windows 3.x. However, in Windows 95 a 32-bit mode and a 16-bit mode are mutually exclusive. When a PC card is to be used in a 16-bit mode, a corresponding 32-bit sub-system (a PCMCIA bus enumerator) must be disabled in turn. In addition, since the switching between the 32-bit mode and the 16-bit mode is not a dynamic process but a static one, if the 32-bit mode can not be enabled during the operation if it is disabled at the time of OS boot sequence.

The employment of a PC card in the Windows 95 native mode is accompanied by the following problems.

(1) Before a CardBus PC card is used, a Cardbus driver for DOS/Windows 3.x (a 16-bit driver) must be loaded into the system and a PCMCIA bus enumerator (a 32-bit driver) must be disabled in turn. In this case, Windows 95 native mode device drivers can not be used at all. In this context, when a PC card for Windows 95 is inserted into the system, either it must be driven by a 16-bit driver for DOS/Windows 3.x, or it can not be driven at all. As a result, the advantages available with the Windows 95 native mode drivers, such as the automatic loading of client drivers, can not be utilized.

(2) As a result of a sub-system in Windows 95 being operated in the 16-bit mode, 32 bits and 16 bits switching is constantly performed in the kernel of the OS, and the performance of the entire system is always lowered.

(3) When a CardBus PC card is inserted into the system while the PCMCIA bus enumerator (a 32-bit driver) is being enabled, a corresponding device driver (a 16-bit driver other than that of Windows 95) can not be used in turn, and the PC card can not be operated. In other words, it may happen that the insertion of a different PC card version is limited at times. This greatly deteriorates the PnP function of the PC card. The usability of an apparatus, such as a notebook computer for which dynamic configuration of the system resource is required, is lost.

There are other conventional PC cards that can not be driven by Windows 95 native mode drivers because the PC cards conform to an older PCMCIA/JEIDA version. A user who owns such a conventional product has no choice but to employ a conventional device driver intended for DOS/Windows 3.x, and will also encounter the above problems.

(1) For client registration, the Card Service registers an entry point (i.e., a common address at which an event record is to be transmitted to a client) at which a callback routine is entered relative to a client driver.

(2) The PCMCIA bus enumerator in Windows 95 provides a programming interface (PI) between the Socket Service and the other portions. Therefore, the other PC card makers can replace the native Socket Service of Windows 95 with their own Socket Services.

(3) "PCMCIA Rel 2.1/JEIDA Ver 4.2", that is the PC card specification prescribed in 1993, specifies card attribute information (CIS), a Card Service, a Socket Service and an interface. The "PC card standard", that is the PC card specification prescribed in 1995, upgrades the conventional specifications and also describes CardBus, a power management specification, and a multi-function.

It is, therefore, one object of the present invention to provide a superior method for automatically enabling a peripheral device, which can be applied to an information processing system that has both a peripheral device driven by a device driver in a first addressing mode and a peripheral device driven by a device driver in a second addressing mode, whereby a peripheral device can be enabled and driven by an appropriate device driver.

It is another object of the present invention to provide a superior method for automatically enabling a PC card, which can be applied to an information processing system that has a PC card driven by a 16-bit device driver and a PC card driven by a 32-bit device driver, whereby a PC card can be enabled and driven by an appropriate device driver.

It is an additional object of the present invention to provide a superior method for automatically enabling a PC card whereby, when a PC card that can be driven only by a DOS/Windows 3.x device driver is inserted, the PC card is enabled by that device driver, and whereby, when a PC card is inserted that can be driven by a Windows 95 native mode device driver, the PC card is enabled by that device driver.

It is a further object of the present invention to provide a superior method for automatically enabling a PC card whereby a sub-system in Windows 95, e.g., a PCMCIA sub-system, can, in appearance, be dynamically switched between a 32-bit mode and a 16-bit mode.

SUMMARY OF THE PRESENT INVENTION

To achieve the above objects, according to a first aspect of the present invention, a method, for automatically enabling a peripheral device, that can be applied to an information processing system which may be plugged with both a peripheral device driven by a device driver of a first addressing mode and a peripheral device driven by a device driver of a second addressing mode, comprises the steps of: (a) detecting an insertion event when a peripheral device is inserted into the information processing system; (b) giving priority, in response to the insertion event, to the device driver of the first addressing mode in enabling the peripheral device; and (c) giving chance, in response to the insertion event, to the device driver of the second addressing mode in enabling the peripheral device if the inserted device is not enabled by any device drivers of the first addressing mode.

According to a second aspect of the present invention, a method, for automatically enabling a PC card, that can be applied to an information processing system which may be plugged with both a PC card driven by a device driver of a 16-bit mode and a PC card driven by a device driver of a 32-bit mode, comprises the steps of: (a) detecting an insertion event when a PC card is inserted into the information processing system; (b) giving priority, in response to the event, to the device driver of the 16-bit mode in enabling the PC card; and (c) giving chance, in response to the insertion event, to the device driver of the 32-bit mode in enabling the PC card if the PC card is not enabled by any device drivers of the 16-bit mode.

According to a third aspect of the present invention, a method, for automatically enabling a PC card, that can be applied to an information processing system that is controlled by an operating system having either a 32-bit mode or a 16-bit mode, and that have a plurality of device drivers for both a 32-bit mode and a 16-bit mode, comprises the steps of: (a) detecting an insertion event when a PC card is inserted into the information processing system; (b) giving priority, in response to the insertion event, to the device driver of the 16-bit mode in enabling the PC card; and (c) giving chance, in response to the insertion event, to the device driver of the 32-bit mode in enabling the PC card if the PC card is not enabled by any device drivers of the 16-bit mode.

According to a fourth aspect of the present invention, a method, for automatically enabling a peripheral device, that can be applied to an information processing system which may be plugged with both a peripheral device driven by a device driver of a first addressing mode and a peripheral device driven by a device driver of a second addressing mode, comprises the steps of: (a) detecting an insertion event when a peripheral device is inserted into the information processing system; (b) giving priority, in response to the insertion event, to the device driver of the first addressing mode in ascertaining whether the device driver can operate the peripheral device; (c) the device driver requesting, when a response at the step (b) is affirmative, allocation of system resources to the inserted peripheral device; (d) allocating, in response to a request at the step (c), the system resources for the inserted peripheral device; (e) giving chance, in response to the insertion event, to the device driver of the second addressing mode in ascertaining whether the device driver can operate the peripheral device if the peripheral device is not enabled by the device driver of the first addressing mode; (f) the device driver requesting, when a response at the step (e) is affirmative, allocation of system resources to the inserted peripheral device; and (g) allocating, in response to a request at the step (f), the system resources for the inserted peripheral device.

According to a fifth aspect of the present invention, a method, for automatically enabling a PC card, that can be applied to an information processing system which may be plugged with both a PC card driven by a device driver of a 16-bit mode and a PC card driven by a device driver of a 32-bit mode, comprises the steps of: (a) detecting an insertion event when a PC card is inserted into the information processing system; (b) giving priority, in response to the insertion event, to the device driver of the 16-bit mode in ascertaining whether the device driver can operate the PC card; (c) the device driver requesting, when a response at the step (b) is affirmative, allocation of system resources to the inserted PC card; (d) allocating, in response to a request at the step (c), the system resources for the inserted PC card; (e) giving chance, in response to the insertion event, to the device driver of the 32-bit mode in ascertaining whether the device driver can operate the PC card if the PC card is not enabled by the device driver of the 16-bit mode; (f) the device driver requesting, when a response at the step (e) is affirmative, allocation of system resources to the inserted PC card; and (g) allocating, in response to a request at the step (f), the system resources for the inserted PC card.

According to a sixth aspect of the present invention, a method, for automatically enabling a PC card, that can be applied to an information processing system that is controlled by an operating system having either a 32-bit mode or a 16-bit mode, and that have a plurality of device drivers for both a 32-bit mode and a 16-bit mode, comprises the steps of: (a) detecting an insertion event when a PC card is inserted into the information processing system; (b) giving priority, in response to the insertion event, to the device driver of the 16-bit mode in ascertaining whether the device driver can operate the PC card; (c) the device driver requesting, when a response at the step (b) is affirmative, allocation of system resources to the inserted PC card; (d) allocating, in response to a request at the step (c), the system resources for the inserted PC card; (e) giving chance, in response to the insertion event, to the device driver of the 32-bit mode in ascertaining whether the device driver can operate the PC card if the PC card is not enabled by the device driver of the 16-bit mode; (f) the device driver requesting, when a response at the step (e) is affirmative, allocation of system resources to the inserted PC card; and (g) allocating, in response to a request at the step (f), the system resources for the inserted PC card.

According to a seventh aspect of the present invention, a method, for automatically enabling a peripheral device, that can be applied to an information processing system which may be plugged with both a peripheral device driven by a device driver of a first addressing mode and a peripheral device driven by a device driver of a second addressing mode, comprises the steps of: (a) detecting a removal event when an inserted peripheral device is removed; (b) notifying, when the removed peripheral device was driven by the device driver of the first addressing mode, the device driver of the removal event; (c) the device driver of the first addressing mode releasing, upon receipt of the notification at the step (b), system resources assigned to the removed peripheral device so as to disable the peripheral device; (d) notifying, when the removed peripheral device was driven by the device driver of the second addressing mode, the device driver of the removal event; and (e) the device driver of the second addressing mode releasing, upon receipt of the notification at the step (d), system resources assigned to the removed peripheral device so as to disable the peripheral device.

According to an eighth aspect of the present invention, a method, for automatically enabling a PC card, that can be applied to an information processing system which may be plugged with both a PC card driven by a device driver of a 16-bit mode and a PC card driven by a device driver of a 32-bit mode, comprises the steps of: (a) detecting a removal event when an inserted PC card is removed; (b) notifying, when the removed PC card was driven by the device driver of the 16-bit mode, the device driver of the removal event; (c) the device driver of the 16-bit mode releasing, upon receipt of the notification at the step (b), system resources assigned to the removed PC card so as to disable the PC card; (d) notifying, when the removed PC card was driven by the device driver of the 32-bit mode, the device driver of the removal event; and (e) the device driver of the 32-bit mode releasing, upon receipt of the notification at the step (d), system resources assigned to the removed PC card so as to disable the PC card.

According to a ninth aspect of the present invention, a method, for automatically enabling a PC card, that can be applied to an information processing system that is controlled by an operating system having either a 32-bit mode or a 16-bit mode, and that have a plurality of device drivers for both a 32-bit mode and a 16-bit mode, comprises the steps of: (a) detecting a removal event when an inserted PC card is removed; (b) notifying, when the removed PC card was driven by the device driver of the 16-bit mode, the device driver of the removal event; (c) the device driver of the 16-bit mode releasing, upon receipt of the notification at the step (b), system resources assigned to the removed PC card so as to disable the PC card; (d) notifying, when the removed PC card was driven by the device driver of the 32-bit mode, the device driver of the removal event; and (e) the device driver of the 32-bit mode releasing, upon receipt of the notification at the step (d), system resources assigned to the removed PC card so as to disable the PC card.

According to a tenth aspect of the present invention, provided is a computer programmable storage device in which physically stored is a computer program for executing a process for automatically enabling a peripheral device on a computer system, which is operated in a first addressing mode or in a second addressing mode, the process comprises: (a) detecting an insertion event when a peripheral device is inserted into the information processing system; (b) giving priority, in response to the insertion event, to the device driver of the first addressing mode in ascertaining whether the device driver can operate the peripheral device; (c) the device driver requesting, when a response at the step (b) is affirmative, allocation of system resources to the inserted peripheral device; (d) allocating, in response to a request at the step (c), the system resources for the inserted peripheral device; (e) giving chance, in response to the insertion event, to the device driver of the second addressing mode in ascertaining whether the device driver can operate the peripheral device if the peripheral device is not enabled by the device driver of the first addressing mode; (f) the device driver requesting, when a response at the step (e) is affirmative, allocation of system resources to the inserted peripheral device; and (g) allocating, in response to a request at the step (f), the system resources for the inserted peripheral device.

According to an eleventh aspect of the present invention, provided is a computer programmable storage device in which physically stored is a computer program for executing a process for automatically enabling a PC card on a computer system, which is operated in a 16-bit mode or in a 32-bit mode, the process comprises: (a) detecting an insertion event when a PC card is inserted into the information processing system; (b) giving priority, in response to the insertion event, to the device driver of the 16-bit mode in ascertaining whether the device driver can operate the PC card; (c) the device driver requesting, when a response at the step (b) is affirmative, allocation of system resources to the inserted PC card; (d) allocating, in response to a request at the step (c), the system resources for the inserted PC card; (e) giving chance, in response to the insertion event, to the device driver of the 32-bit mode in ascertaining whether the device driver can operate the PC card if the PC card is not enabled by the device driver of the 16-bit mode; (f) the device driver requesting, when a response at the step (e) is affirmative, allocation of system resources to the inserted PC card; and (g) allocating, in response to a request at the step (f), the system resources for the inserted PC card.

According to a twelfth aspect of the present invention, provided is a computer programmable storage device in which physically stored is a computer program for executing a process for automatically enabling a PC card on a computer system, which has a plurality of device drivers for a 32-bit mode and for a 16-bit mode, the process comprises: (a) detecting an insertion event when a PC card is inserted into the information processing system; (b) giving priority, in response to the insertion event, to the device driver of the 16-bit mode in ascertaining whether the device driver can operate the PC card; (c) the device driver requesting, when a response at the step (b) is affirmative, allocation of system resources to the insertion PC card; (d) allocating, in response to a request at the step (c), the system resources for the inserted PC card; (e) giving chance, in response to the insertion event, to the device driver of the 32-bit mode in ascertaining whether the device driver can operate the PC card if the PC card is not enabled by the device driver of the 16-bit mode; (f) the device driver requesting, when a response at the step (e) is affirmative, allocation of system resources to the insertion PC card; and (g) allocating, in response to a request at the step (f), the system resources for the inserted PC card.

According to the method for automatically enabling a peripheral device/PC card in the first through sixth aspects of the present invention, when a PC card that is driven only by a DOS/Windows 3.x compatible 16-bit device driver is inserted into a PC card slot of a computer system, the PC card is automatically enabled by a corresponding 16-bit device driver. And when a PC card that can be driven by a Windows 95 native mode 32-bit device driver is inserted into the computer system, the PC card is automatically enabled by a corresponding 32-bit device driver.

Further, when a PC card that is driven only in the DOS/Windows 3.x compatible mode is replaced with a PC card that can be driven in the Windows 95 native mode, or vice versa, in each case, the PC card is automatically enabled by an appropriate device driver. In appearance, the system can dynamically switch between the Windows 95 native mode and the DOS/Windows 3.x compatible mode.

According to the method for automatically enabling a peripheral device or PC card in the seventh through the ninth aspects of the present invention, when a PC card is removed from a computer system while it is being operated by a DOS/Windows 3.x compatible 16-bit device driver, or when a PC card is removed while it is being operated by a Windows 95 native mode 32-bit device driver, in either case, a corresponding device driver is notified of a removal event when the PC card is removed. As a result, the corresponding device driver releases system resources allocated for the PC card, and disables the PC card.

The computer programmable storage medium of the tenth through the twelfth aspects of the present invention defines a structural and functional interrelationship between a computer program and the storage medium which permits the computer programs functionarity to be realized. In other words, since the computer programmable storage medium is installed in the computer system, the interrelational function can be performed in the computer system, so that the effects obtained in the first through the sixth aspects can be acquired.

The present invention is adequately accomplished by, for example, the Socket Service that directly controls the PC card controller behaving appropriately relative to the 16-bit card service and the 32-bit card service. That is, when the Socket Service provided by Windows 95 is replaced, the present invention is preferably accomplished. It follows then that the designs for a 16-bit Card Service, for a 32-bit Card Service and for the client device drivers for the card services do not have to be changed nor modified to implement the present invention.

According to the second, the third, the fifth, the sixth, the eleventh and the twelfth aspects of the present invention, a 16-bit device driver is given priority to enable a PC card. This is done for the following reasons.

(1) Windows 95 is so designed that a native device driver is loaded automatically or the system displays message to a user, "Install a device driver", when no device driver corresponding to the inserted PC card is installed. In case Windows 95 native mode is given priority, when a PC card driven only by a 16-bit device driver in inserted into the system, the system falls into a user message state (i.e., the wait state), and the program control can not advance to the inquiry to a 16-bit device driver.

(2) The 16 bit device driver is a DOS/Windows 3.x compatible driver. According to the DOS/Windows 3.x environment, a user describes it in a "config.sys" file to define whether respective device drivers are installed.

When the operating system is not designed like Windows 95, there is no real reason to give priority to the inquiry by the 16-bit device driver. For even when priority is given to the 32-bit device driver, the same effects can be obtained.

The other objects, features, and advantages of the present invention will become apparent in due course during the detailed description of the embodiment of the present invention, which will be given while referring to the accompanying drawings.

BRIEF DESCRIPTION OF THE DRAWINGS

FIG. 8 is a block diagram illustrating the software architecture for supporting a PC card.

DESCRIPTION OF THE PREFERRED EMBODIMENT

The preferred embodiments of the present invention will now be described in detail while referring to the accompanying drawings.

A. System configuration

Figure 1:
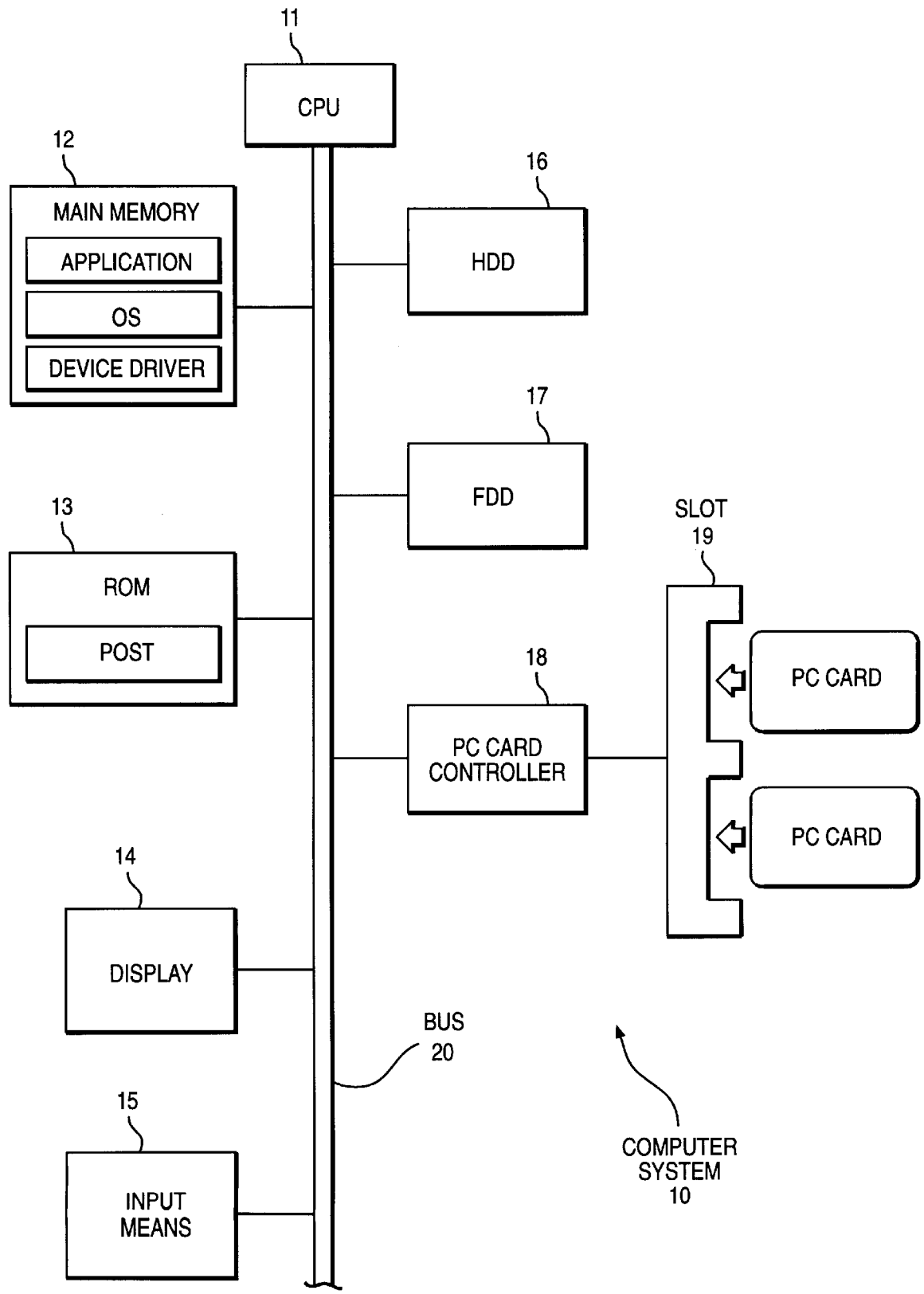
FIG. 1 is a specific diagram illustrating the hardware architecture of a personal computer (PC) according to the present invention.

Hardware architecture:

FIG. 1 is a specific diagram illustrating the hardware architecture of a personal computer (PC) 10 according to the preferred embodiment of the present invention.

The PC 100 comprises a CPU 11; a main memory 12; a ROM 13; a display device 14; a keyboard/mouse 15 as input means; a hard disk drive (HDD) 16; a floppy disk drive (FDD) 17; a PC card controller 18; and a PC card slot 19.

The CPU 11, a main controller, executes various computer programs under the control of an OS that will be described later. The CPU 11 is interconnected with other hardware components via a common signal transfer path (bus) 20, which includes a data signal line, an address signal line and a control signal line.

The main memory 12, which is a writable memory, such as DRAM (Dynamic RAM), is used to load programs (including the OS and PC card device drivers) executed by the CPU 11, or is employed as a work area for a program being executed. The ROM 13 is a non-volatile memory in which predetermined code is permanently stored. The "predetermined code" includes a program (POST) that is executed when the system is activated.

The HDD 16 and the FDD 17, so-called external storage devices, are used to store computer programs and work data. An OS and various device drivers, which cooperate with one another in the embodiment of the present invention, are installed in the HDD 16 and the FDD 17, and are loaded into the main memory 12, as needed, when the system is activated or during operation. The HDD 16 and the FDD 17 employed here may be provided as standard features in the PC 10, or optionally. They may be so connected to the PC 10 that they are detachable.

The PC card slot 19 is so designed that PC cards conforming to the PCMCIA/JEIDA standards can be stored therein. Generally, two Type I/II cards or a single Type III card can be inserted in the slot 19.

The PC card controller 18 is a peripheral controller that provides an interface protocol between the system 10 and the inserted PC card. The controller 18 includes a plurality of registers (not shown), such as a register (a card insertion/removal register) that signals the insertion/removal state at the slot 19 of a PC card. The upper program executed by the CPU 11 can, on a hardware basis, manipulate the PC card controller 18 via the Socket Service. The upper program, the Card Service, for example, performs polling (i.e., periodical monitoring) of the card insertion/removal register via the Socket Service, so that the insertion/removal event of a PC card can be detected. Needless to say, even if the insertion/removal event of a PC card is notified by the issuing of an interrupt request (IRQ) instead of by polling, the same process can be performed.

Many hardware components other than those shown in FIG. 1 are required to constitute the computer system 10, but since these components are well known to one having ordinary skill in the art, and thus are not essential to the subject of the present invention, no explanation for them is given in the specification.

Figure 2:
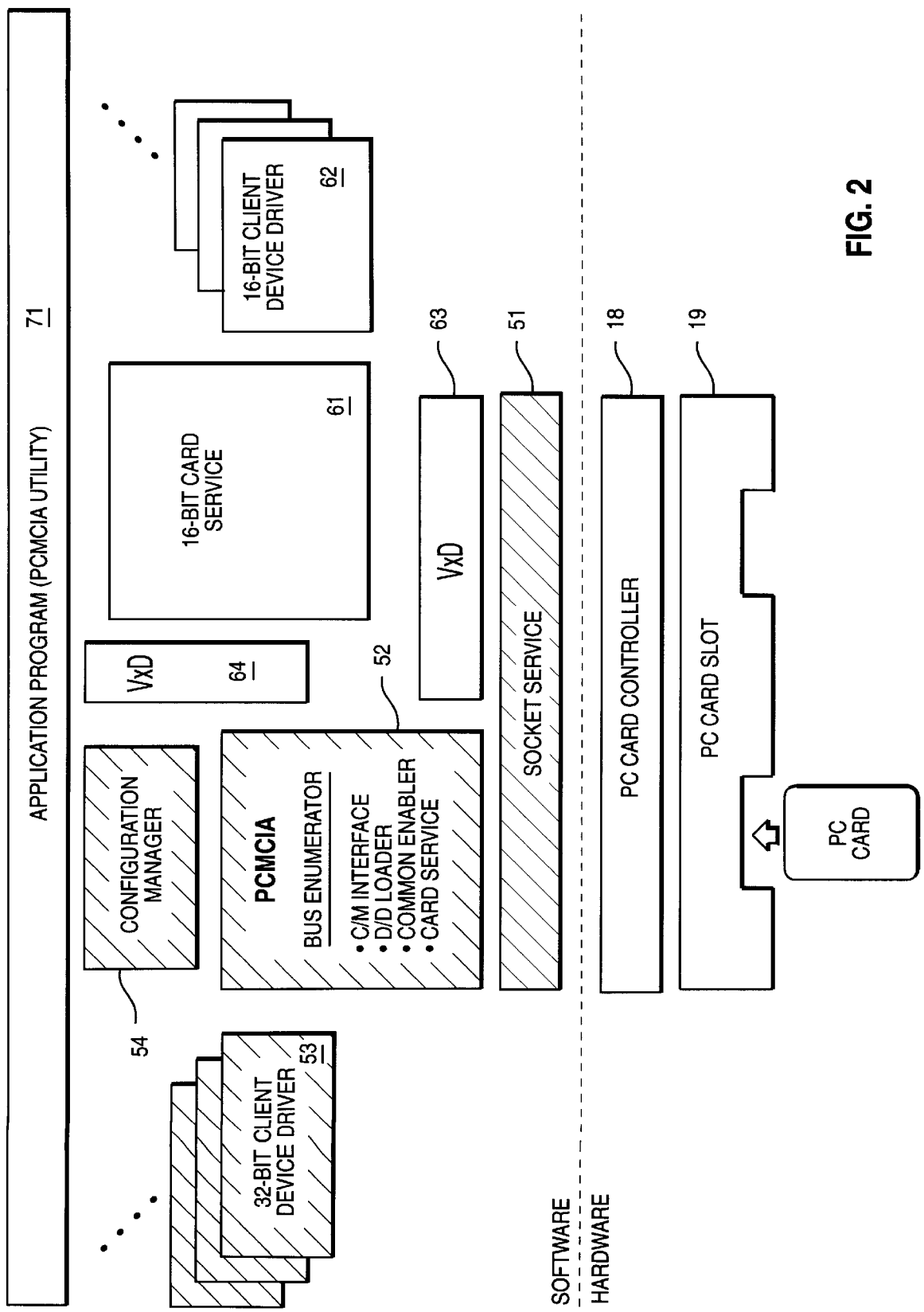
FIG. 2 is a specific diagram illustrating the software architecture for supporting a PnP function according to the present invention.

Software architecture:

FIG. 2 is a specific diagram illustrating the software architecture, especially that for a PCMCIA sub-system, for supporting a PnP function according to the present invention. Shaded blocks in FIG. 2 indicate software that can be operated in a 32-bit mode (Windows 95 native mode). Unshaded blocks indicate software that can be operated in a 16-bit mode (DOS/Windows 3.x compatible mode).

The lowermost software layer is a Socket Service 51 that absorbs the difference between a hardware layer and a software layer. The Socket Service 51 includes a function call for directly accessing the PC card controller 18. A unique function of the Socket Service 51 in this embodiment is the notification it provides of the occurrence of an event at the PC card slot 19 through predetermined procedures relative to the polling performed by the upper Card Services, which will be described later. The subsequent sections B, B-1 and B-2 of this specification should be referred to for a description of the operations performed according to the predetermined procedures. Although the Windows 95 native mode Socket Service does not include the above function, it can be easily replaced with a Socket Service 51 that includes the function, and thus the present invention can be accomplished. This has been described previously.

A PCMCIA bus enumerator 52 comprises: a Card Service, for managing system resources for a PC card; a common enabler, for enabling a PC card; a device driver loader, for automatically loading a 32-bit client device driver 53; and a C/M interface, for interacting with a configuration manager (C/M). The Card Service (hereinafter referred to as a "32-bit Card Service") makes a function call relative to the Socket Service 51, and performs polling of the state of the PC card slot 19 via the Socket Service 51. The common enabler enables a PC card driven by a 32-bit client device driver 53 that has been installed in the system 10. The PCMCIA bus enumerator 52 in this embodiment is a Windows 95 native mode PCMCIA bus enumerator (excluding the Socket Service).

A configuration manager 54 manages the resources for the entire system. The configuration manager 54 performs arbitration so that no conflict arises concerning the system resources required by the PCMCIA bus enumerator 52 and the system resources currently used by another sub-system. The configuration manager 54 can be a Windows 95 native mode configuration manager.

All 32-bit client device drivers 53 are registered as a client in the 32-bit Card Service. The 32-bit client device drivers 53 are used to drive a Windows 95 compatible PC card or a PC card conforming to PCMCIA Rel 2.1. Since the PCMCIA bus enumerator 52 has an automatic loading function, the 32-bit client device driver 53 does not always have to be resident in the memory.

A 16-bit Card Service 61 is provided to control system resources for PC cards that are not enabled in the Windows 95 native mode. The PC cards that are not enabled in the Windows 95 native mode are PC cards that conform to the latest PCMCIA/JEIDA specifications, i.e., "PC Card Standard", or older PC card types that conform to specifications prescribed before PCMCIA Rel 2.1. The Card Service 61 has a function call relative to the Socket Service 51, and performs polling of the state of the PC card slot 19 via the Socket Service 51. The 16-bit Card Service 61 is not a part of the Windows 95 native mode. That is, the Windows 95 does not provide the Card Service 61 as a standard feature. Therefore, a Windows 95 user must install the Card Service 61 to drive a PC card that uses a 16-bit device driver.

All 16-bit client device drivers 62 are registered as a client in the Card Service 61. The 16-bit client device drivers 62 are used to drive PC cards that can not be driven by the Windows 95 native device drivers. Since DOS/Windows 3.x does not have an automatic loading function, the 16-bit client device driver 62 must always be resident in the memory, i.e., must be designated in a "config.sys" file.

Virtual device drivers (VxD) 63 and 64 are provided to absorb differences between addressing modes. The VxD 63 handles the mode differences between the Socket Service 51 and the Card Service 61, while the VxD 64 handles the mode differences between the Card Service 61 and the configuration manager 54. Since the arrangements of VxD 63 and 64 and their operations are not directly related to the subject of the present invention, no further explanation will be given for them.

A so-called application program 71 includes a PCMCIA utility to offer the convenience of use of PC cards.

B. PnP support operation

The hardware and the software arrangements of the computer system 10 have been explained in the previous subdivision. In this section, the operation of the system 10 and the processing of the present invention will be described.

B-1. PC card insertion operation

Figure 3:
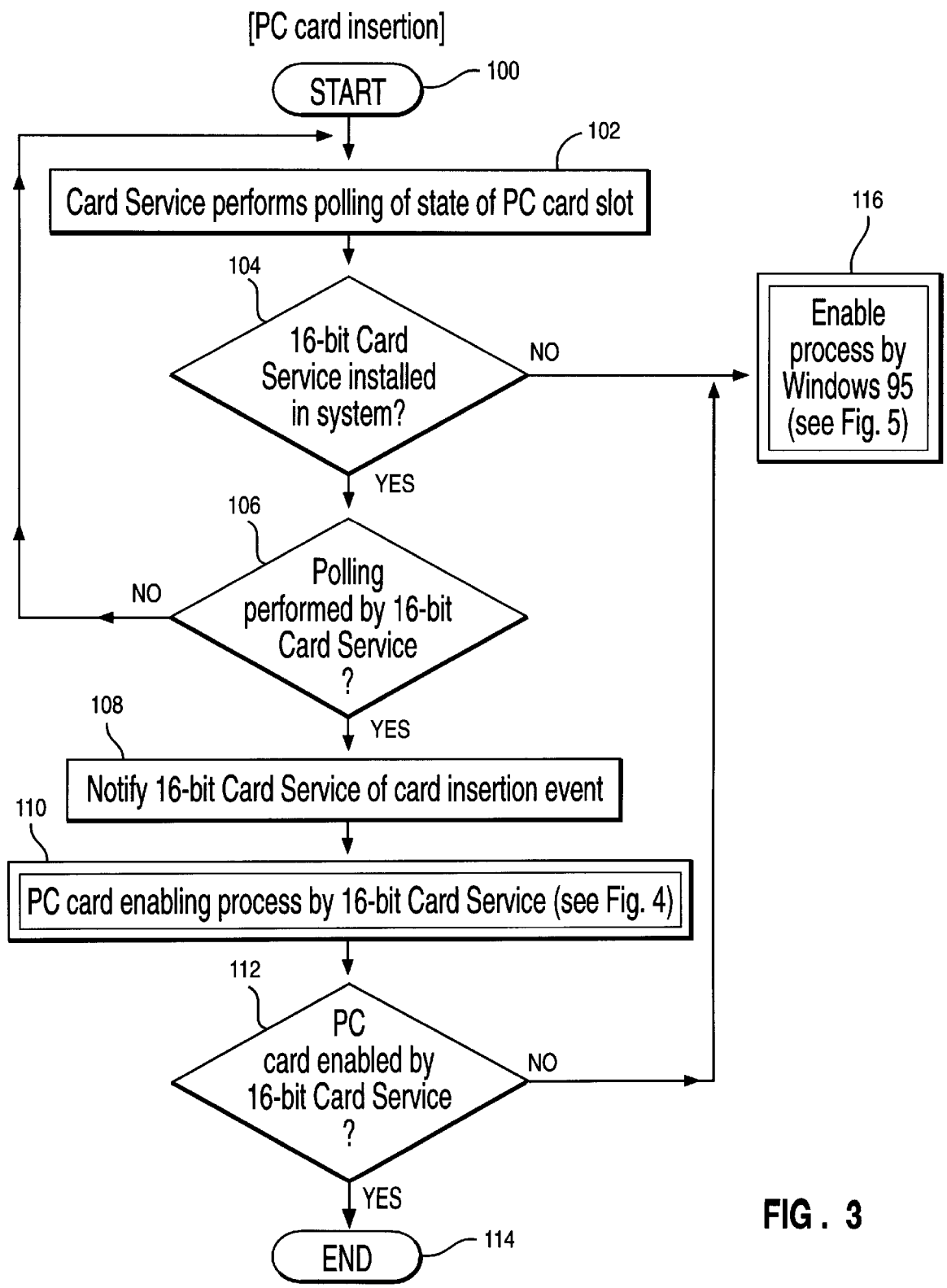
FIG. 3 is a flowchart for a cooperative operation performed by respective device drives in one embodiment when a PC card is inserted into a system 10.

FIG. 3 is a flowchart for a interrelational operation performed by respective device drivers when a PC card is inserted into the system 10.

The process is begun when a PC card is inserted into the PC card slot 19 (step 100).

At this time, the 16-bit Card Service 61 and the 32-bit Card Service are performing polling to determine the state of the PC card slot 19 via the Socket Service 51 (step 102).

When the Socket Service 51 has received a request for polling, first, the Socket Service 51 determines whether or not the 16-bit Card Service 61 is loaded into the system 10 (step 104). When the 16-bit Card Service 61 is not present, the PC card enabling process can not be performed in the DOS/Windows 3.x compatible mode. Program control then branches at the decision step to "No", and a PC card enabling process in the Windows 95 native mode is to be performed (step 116: which will be described later). When the system is activated, the Socket Service 51 generally establishes a programming interface with both Card Cervices 52 and 61. The presence of the 16-bit Card Service 61 can be detected by ascertaining whether this process has been performed.

If the result obtained at decision step 104 is affirmative, program control advances to step 106. The Socket Service 51 ascertains whether or not a received polling request was issued by the 16-bit Card Service 61. When the polling request was issued by a component other than the 16-bit Card Service 61, program control returns to step 102, and waits until a request for polling is issued by the 16-bit Card Service 61.

If the request for polling is issued by the 16-bit Card Service 61, the Socket Service 51 notifies the 16-bit Card Service 61 of the insertion of the PC card (insertion event) (step 108).

Upon receipt of the notice, the 16-bit Card Service 61 performs a PC card enabling process, i.e., an enabling process in the DOS/Windows 3.x compatible mode (step 110). The enabling process will be described later in detail.

At step 112, the Socket Service 51 determines whether the PC card has actually been enabled by the 16-bit Card Service. This determination can be performed by ascertaining whether the Socket Service 51 has programmed a new system resource into the PC card controller 18.

When the PC card enabling process has not been performed by the 16-bit Card Service 61, the PC card enabling process must be performed using a 32-bit Card Service (Windows 95 native mode) in turn. Program control therefore branches at decision step 112 to "No", and advances to step 116, whereupon a PC card enabling process in the Windows 95 native mode will be performed.

If the PC card enabling process has been completed by the 16-bit Card Service 61, program control branches at decision step 112 to "Yes", and the processing is thereafter terminated (step 114). After this, the Socket Service 51 continues to ignore the polling by the 32-bit Card Service. As a result, the 32-bit Card Service is not notified of the insertion of the PC card that is actually inserted into the system, so that a PC card enabling process in the Windows 95 native mode is not performed. The PC card is driven by the 16-bit client device driver 62 thereafter.

Two decision steps 104 and 106 are provided in the flowchart, so that the 16-bit Card Service 61 is notified first of the card insertion event, and priority is given to the PC card enabling process in the DOS/Windows 3.x compatible mode. This is done for the following reason: While Windows 95 automatically loads its native device driver, when a device driver corresponding to a inserted PC card has not been installed, Windows 95 displays a message requesting a user to "Install a device driver". When the Windows 95 native mode Card Service is notified before the other mode Card Service, the system will pass into a user message state, i.e., a wait state. Even if a PC card that can be driven only by a 16-bit client device driver 62 is inserted, the enabling process can not be performed in the DOS/Windows 3.x compatible mode (16-bit Card Service 61). However, in case an operating system is not designed like Windows 95, there is no real reason for a 16-bit device driver to be favored over another, and priority may be given to a 32-bit device driver.

Figure 4:
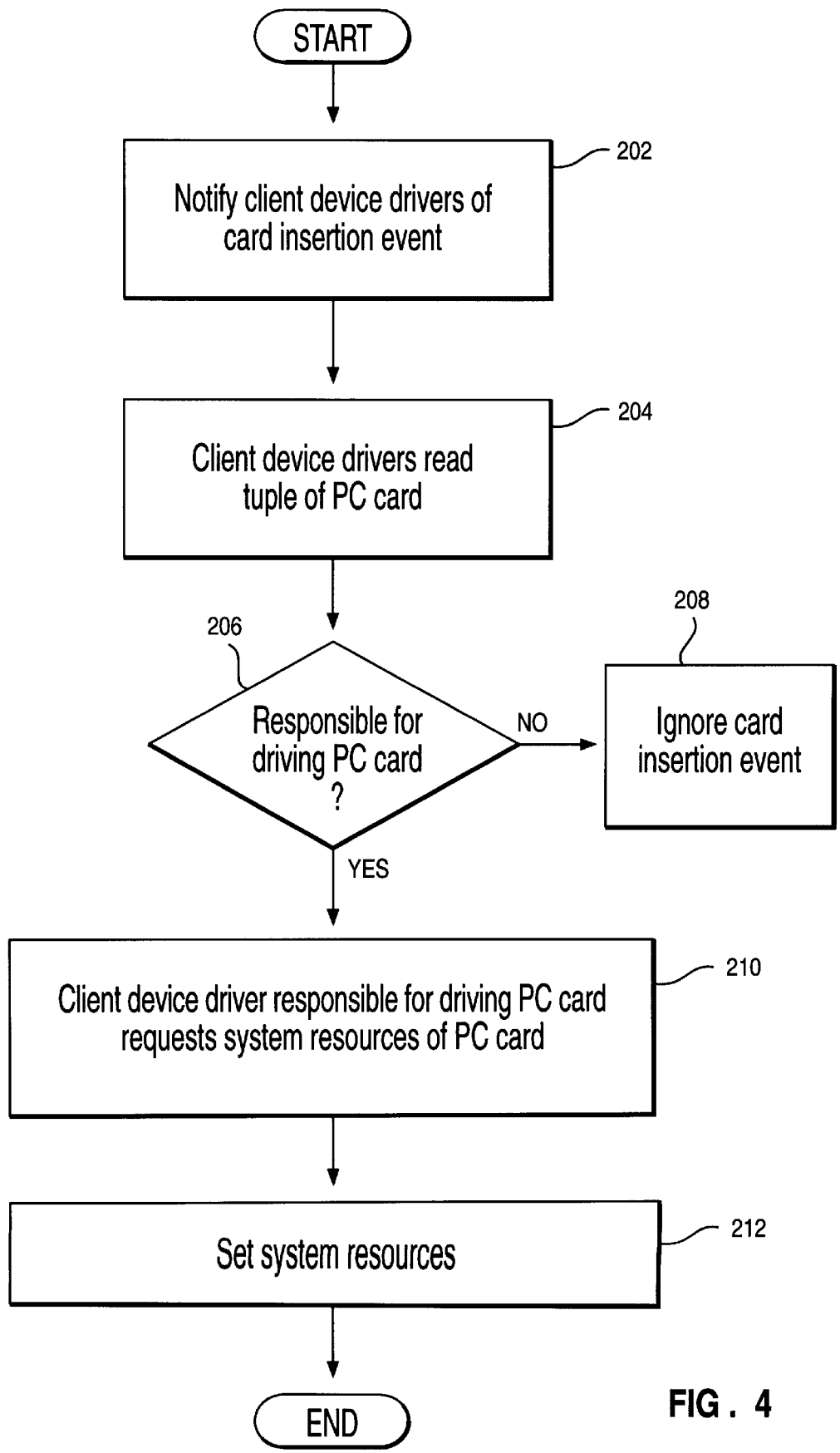
FIG. 4 is a flowchart for a process for allocating system resources in the DOS/Windows 3.x compatible mode for an inserted PC card.

Enabling process in DOS/Windows 3.x compatible mode:
FIG. 4 is a detailed flowchart of the process for enabling a PC card in the DOS/Windows 3.x compatible mode, i.e., step 110 in FIG. 3.

When, as a result of polling, it is determined that a card insertion event has occurred, the 16-bit Card Service 61 notifies the respective client device drivers 62 registered in the card service 61 of the card insertion event (step 202).

The client device drivers 62 read card attribute information (tuple) from the memory in the PC card via the Card Service 61 and the Socket Service 51 (step 204). In accordance with the contents of the tuple, each client device driver 62 ascertains whether it should drive the PC card (step 206).

The client device drivers 62, which have ascertained they are not responsible for driving that PC card, ignore the card insertion event at step 208, and do not perform an enabling process.

On the other hand, at step 210, a client device driver 62 that has ascertained it is responsible for driving the PC card, and that understands, from the contents of the tuple, the system resources that the PC card requires, requests the allocation of system resources by the 16-bit Card Service 61.

The 16-bit Card Service 61 refers to its own resource table, and also queries the configuration manager 54 via the virtual device driver 64 to confirm the use of the system resources. When the use of the system resources has been confirmed, the client device driver 62 programs the PC card controller 18 via the 16-bit Card Service 61, and adds the PC card to the system configuration (step 212). As a result, the PC card is enabled in the DOS/Windows 3.x compatible mode.

Figure 5:
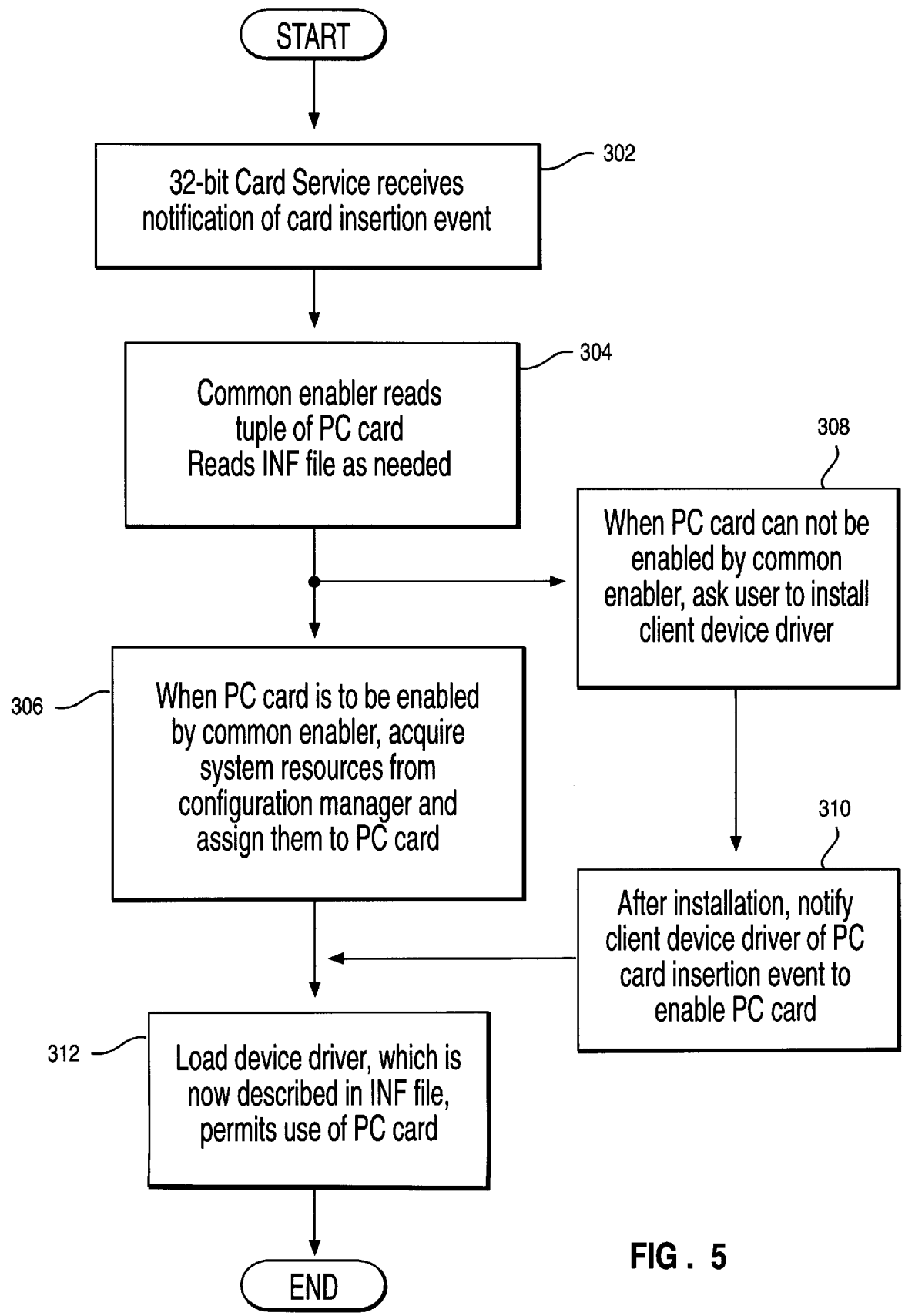
FIG. 5 is a flowchart for a process for allocating system resources in the Windows 95 native mode for an inserted PC card.

Enabling process in Windows 95 native mode:
FIG. 5 is a detailed flowchart of the process for enabling a PC card in the Windows 95 native mode, i.e., step 116 in FIG. 3.

First, the 32-bit Card Service requests the Socket Service 51 perform polling, and receives notification of a card insertion event (step 302).

Then, the common enabler in the PCMCIA bus enumerator 52 reads card attribute information (tuple) from the memory in the PC card via the 32-bit Card Service and the Socket Service 51 (step 304). Further, when necessary, the common enabler reads an INF file, which contains information concerning the driving of a PC card, from an auxiliary storage device, such as the FDD 17.

When it is ascertained, from the tuple and the INF file contents, that the common enabler can enable the inserted PC card, the common enabler forwards a request to the configuration manager 54 for system resources to be used by the PC card. Then, the common enabler programs the PC card controller 18 via the 32-bit Card Service and the Socket Service 51 (step 306). As a result, the PC card is enabled in the Windows 95 native mode.

When it is ascertained that the PC card is a card that can not be enabled by the common enabler, a message to a user is displayed requesting the installation of a corresponding client device driver 53 in the system 10, i.e., that it must be copied to the HDD 17 (step 308). When the client device driver designated 53 by a user has been installed, the client device driver 53 is notified of the card insertion event and the PC card enabling process, i.e., the allocation of system resources, is performed (step 310). As a result, the PC card is enabled in the Windows 95 native mode.

When the PC card is enabled, the device driver loader in the PCMCIA bus enumerator automatically loads into the memory 12 the client device driver 53 described in the INF file (step 312). As a result, the system 10 can use the PC card.

Figure 6:
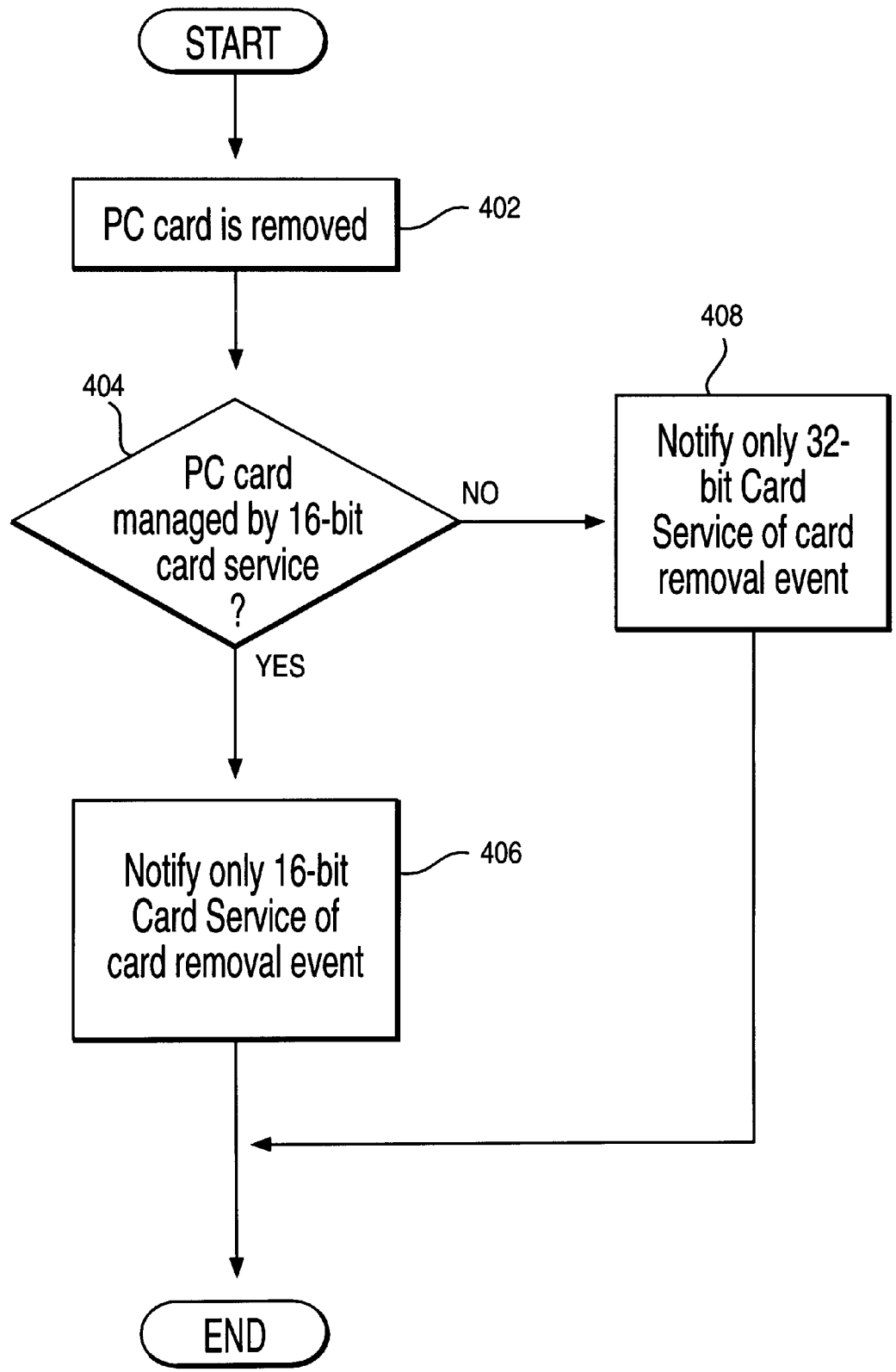
FIG. 6 is a flowchart for cooperative operation performed by respective device drives in the embodiment when a PC card is removed from the system 10.
Figure 7A:
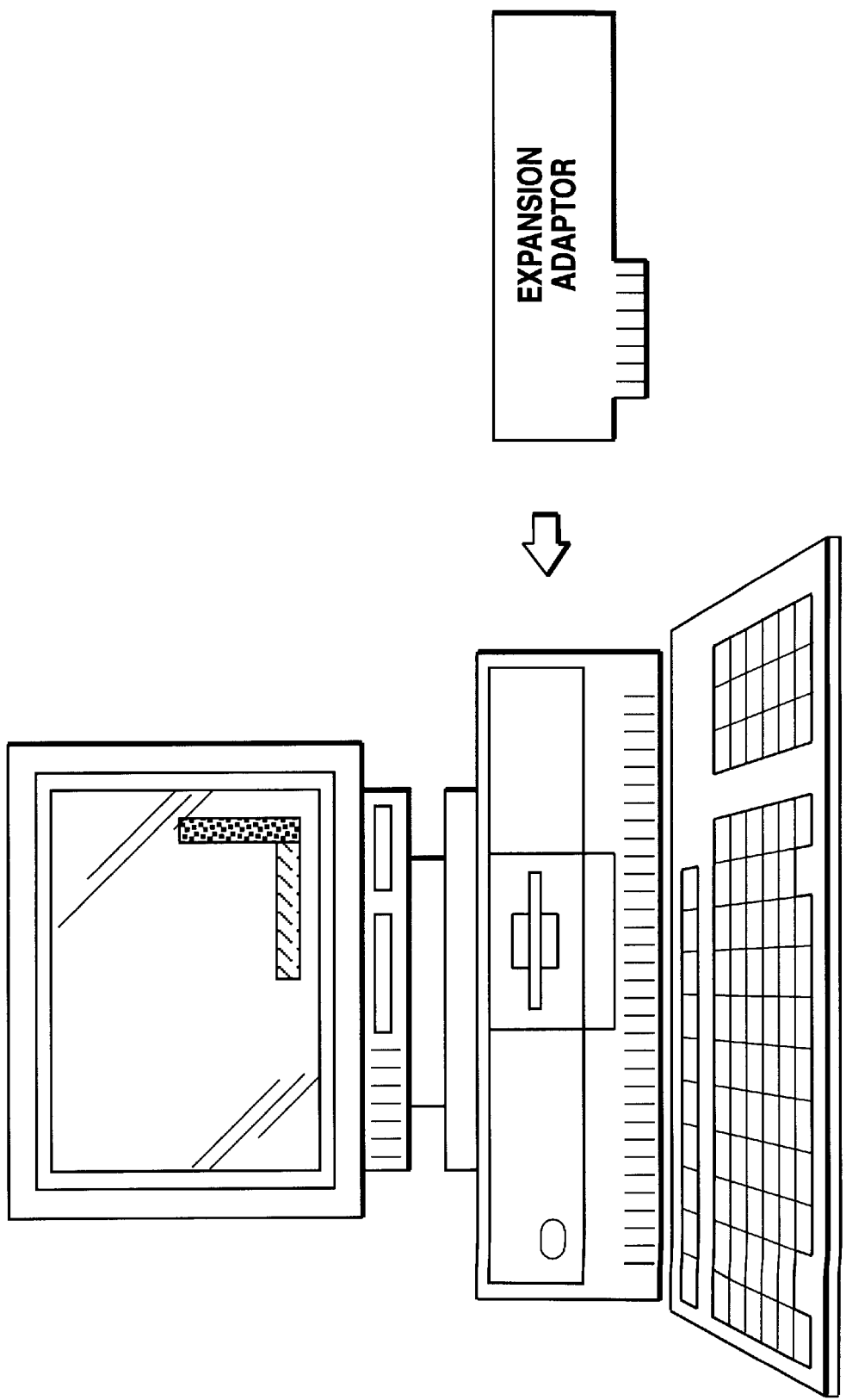
FIG. 7 is a diagram illustrating the state when the configuration of a personal computer is expanded by adding a peripheral device, with FIG. 7(a) showing more specifically the condition where an expansion adaptor card is inserted into a desktop computer and with FIG. 7(b) more specifically showing the condition where a PC card is inserted into a notebook computer.
Figure 9:
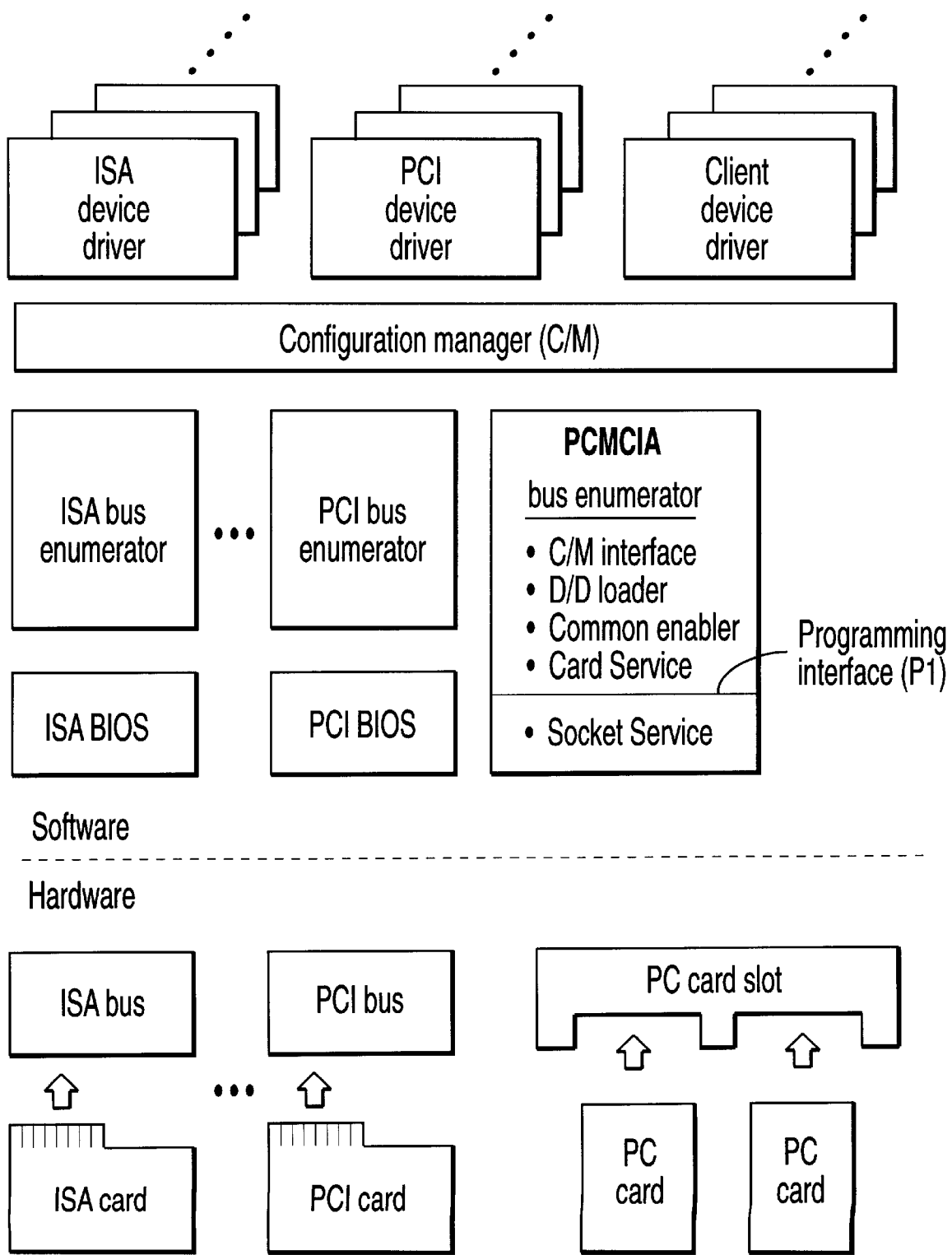
FIG. 9 is a block diagram illustrating the PnP architecture of Windows 95.

B-2. PC card removal operation:
FIG. 6 is a flowchart showing the interrelational operation performed by the device drivers in this embodiment when the PC card is removed from the system 10.

When the PC card is removed (step 402), the Socket Service 51 ascertains whether the PC card is controlled by the 32-bit Card Service or by the 16-bit Card Service 61 (step 404).

If the PC card is managed by the 16-bit Card Service 61, the Socket Service 51 notifies only the 16-bit Card Service 61 of the card removal event detected by the polling (step 406). As a result, the 16-bit Card Service 61 notifies a corresponding client device driver 62 of the removal event, and upon receipt of the notice, the client device driver 62 releases the system resources allocated for the PC card and disables the PC card.

When the PC card is managed by the 32-bit Card Service, the Socket Service 51 notifies only the 32-bit Card Service of the card removal event detected by the polling (step 408). As a result, the 32-bit Card Service notifies a corresponding client device driver 53 of the removal event, and upon receipt of the notice, the client device driver 53 releases the system resources allocated for the PC card and disables the PC card.

After the PC card has been disabled in this manner, the Socket Service 51 waits for the next insertion of a PC card.

The present invention has been described in detail while referring to a specific embodiment. However, it should be apparent to one having ordinary skill in the art that various modifications or revisions of the embodiment are possible within the scope of the present invention. Although, in this specification, the automatic enabling of a PC card that conforms to the PCMCIA/JEIDA standards has been explained, the subject of the present invention is not thereby limited. The present invention can be applied to an information processing system that can be equipped, as a standard feature or as an option, with a peripheral device such as a memory card that conforms to other standards or an I/O card. That is, although the present invention has been disclosed by using an example, it should not be limited to that example. To fully understand the subject of the present invention, the claims should be referred to.

As is described above, according to the present invention, provided is a superior method for automatically enabling a peripheral device, which can be applied to an information processing system that has both a peripheral device driven by a device driver in a first addressing mode and a peripheral device driven by a device driver in a second addressing mode, whereby a peripheral device can be enabled and driven by an appropriate device driver.

More specifically, according to the present invention, when a PC card that can be driven only by a DOS/Windows 3.x device driver is inserted, the PC card is enabled by that device driver, and when a PC card is inserted that can be driven by a Windows 95 native mode device driver, the PC card is enabled by that device driver. In other words, in appearance, the PCMCIA sub-system can dynamically switch between the Windows 95 native mode and the DOS/Windows 3.x compatible mode.

I claim:

1. A method, for automatically enabling a peripheral device, that can be applied to an information processing system which may be plugged with both a peripheral device driven by a device driver of a first addressing mode and a peripheral device driven by a device driver of a second addressing mode, comprising the steps of:

(a) detecting an insertion event when a peripheral device is inserted into said information processing system;

(b) giving priority, in response to the insertion event, to a device driver of said first addressing mode in enabling said peripheral device;

(c) successively initiating multiple first address mode device drivers;

(d) detecting for peripheral device enablement with each successive first address mode device driver; and (e) giving chance, in response to the insertion event, to a device driver of said second addressing mode in enabling said peripheral device if said inserted device is not enabled by any device drivers of the first addressing mode.

2. A method, for automatically enabling a PC card, that can be applied to an information processing system which may be plugged with both a PC card driven by a device driver of a 16-bit mode and a PC card driven by a device driver of a 32-bit mode, comprising the steps of:

(a) detecting an insertion event when a PC card is inserted into said information processing system;

(b) giving priority, in response to the insertion event, to a device driver of said 16-bit mode in enabling said PC card;

(c) initiating said 16-bit mode device driver;

(d) detecting for PC card enablement by said 16-bit mode device driver; and (e) giving chance, in response to the insertion event, to a device driver of said 32-bit mode in enabling said PC card if said PC card is not enabled by any device drivers of said 16-bit mode.

3. A method, for automatically enabling a PC card, that can be applied to an information processing system which is controlled by an operating system having either a 32-bit mode or a 16-bit mode, and that have a plurality of device drivers of both a 32-bit mode and a 16-bit mode, comprising the steps of:

(a) detecting an insertion event when a PC card is inserted into said information processing system;

(b) giving priority, in response to the insertion event, to a device driver of said 16-bit mode in enabling said PC card;

(c) successively initiating multiple 16-bit mode device drivers;

(d) detecting for PC card enablement with each successive 16-bit mode device driver; and (e) giving chance, in response to the insertion event, to a device driver of said 32-bit mode in enabling said PC card if said PC card is not enabled by any device drivers of said 16-bit mode.

4. A method, for automatically enabling a peripheral device, that can be applied to an information processing system which may be plugged with both a peripheral device driven by a device driver of a first addressing mode and a peripheral device driven by a device driver of a second addressing mode, comprising the steps of:

(a) detecting an insertion event when a peripheral device is inserted into said information processing system;

(b) giving priority, in response to the insertion event, to a device driver of said first addressing mode in ascertaining whether said device driver can operate said peripheral device;

(c) said device driver requesting, when a response at said step (b) is affirmative, allocation of system resources to said inserted peripheral device;

(d) allocating, in response to a request at said step (c), said system resources for said inserted peripheral device;

(e) giving chance, in response to the insertion event, to a device driver of said second addressing mode in ascertaining whether said device driver can operate said peripheral device if said peripheral device is not enabled by said device driver of said first addressing mode;

(f) said device driver requesting, when a response at said step (e) is affirmative, allocation of system resources to said inserted peripheral device; and (g) allocating, in response to a request at said step (f), said system resources for said inserted peripheral device.

5. A method, for automatically enabling a PC card, that can be applied to an information processing system which may be plugged with both a PC card driven by a device driver of a 16-bit mode and a PC card driven by a device driver of a 32-bit mode, comprising the steps of:

(a) detecting an insertion event when a PC card is inserted into said information processing system;

(b) giving priority, in response to the insertion event, to a device driver of said 16-bit mode in ascertaining whether said device driver can operate said PC card;

(c) said device driver requesting, when a response at said step (b) is affirmative, allocation of system resources to said inserted PC card;

(d) allocating, in response to a request at said step (c), said system resources for said inserted PC card;

(e) giving chance, in response to the insertion event, to a device driver of said 32-bit mode in ascertaining whether said device driver can operate said PC card if said PC card is not enabled by said device driver of said 16-bit mode;

(f) said device driver requesting, when a response at said step (e) is affirmative, allocation of system resources to said inserted PC card; and (g) allocating, in response to a request at said step (f), said system resources for said inserted PC card.

6. A method, for automatically enabling a PC card, that can be applied to an information processing system which is controlled by an operating system having either a 32-bit mode or a 16-bit mode, and that have a plurality of device drivers of both a 32-bit mode and a 16-bit mode, comprising the steps of:

(a) detecting an insertion event when a PC card is inserted into said information processing system;

(b) giving priority, in response to the insertion event, to a device driver of said 16-bit mode in ascertaining whether said device driver can operate said PC card;

(c) said device driver requesting, when a response at said step (b) is affirmative, allocation of system resources to said inserted PC card;

(d) allocating, in response to a request at said step (c), said system resources for said inserted PC card;

(e) giving chance, in response to the insertion event, to a device driver of said 32-bit mode in ascertaining whether said device driver can operate said PC card if said PC card is not enabled by said device driver of said 16-bit mode;

(f) said device driver requesting, when a response at said step (e) is affirmative, allocation of system resources to said inserted PC card; and (g) allocating, in response to a request at said step (f), said system resources for said inserted PC card.

7. A method, for automatically enabling a peripheral device, that can be applied to an information processing system which may be plugged with both a peripheral device driven by a device driver of a first addressing mode and a peripheral device driven by a device driver of a second addressing mode, comprising the steps of:

(a) detecting an removal event when an inserted peripheral device is removed;

(b) notifying, when said removed peripheral device was driven by a device driver of said first addressing mode, said device driver of the removal event;

(c) the device driver of said first addressing mode releasing, upon receipt of the notification at said step (b), system resources assigned to said removed peripheral device so as to disable said peripheral device;

(d) notifying, when said removed peripheral device was driven by a device driver of said second addressing mode, said device driver of the removal event; and (e) the device driver of said second addressing mode releasing, upon receipt of the notification at said step (d), system resources assigned to said removed peripheral device so as to disable said peripheral device.

8. A method, for automatically enabling a PC card, that can be applied to an information processing system which may be plugged with both a PC card driven by a device driver of a 16-bit mode and a PC card driven by a device driver of a 32-bit mode, comprising the steps of:

(a) detecting a removal event when an inserted PC card is removed;

(b) notifying, when said removed PC card was driven by a device driver of said 16-bit mode, said device driver of the removal event;

(c) said device driver of said 16-bit mode releasing, upon receipt of the notification at said step (b), system resources assigned to said removed PC card so as to disable said PC card;

(d) notifying, when said removed PC card was driven by a device driver of said 32-bit mode, said device driver of the removal event; and (e) said device driver of said 32-bit mode releasing, upon receipt of the notification at said step (d), system resources assigned to said removed PC card so as to disable said PC card.

9. A method, for automatically enabling a PC card, that can be applied to an information processing system which is controlled by an operating system having either a 32-bit mode or a 16-bit mode, and that have a plurality of device drivers for both a 32-bit mode and a 16-bit mode, comprising the steps of:

(a) detecting a removal event when an inserted PC card is removed;

(b) notifying, when said removed PC card was driven by a device driver of said 16-bit mode, said device driver of the removal event;

(c) said device driver of said 16-bit mode releasing, upon receipt of the notification at said step (b), system resources assigned to said removed PC card so as to disable said PC card;

(d) notifying, when said removed PC card was driven by a device driver of said 32-bit mode, said device driver of said event; and (e) said device driver of said 32-bit mode releasing, upon receipt of the notification at said step (d), system resources assigned to said removed PC card so as to disable said PC card.

10. A computer programmable storage device in which physically stored is a computer program for executing a process for automatically enabling a peripheral device on a computer system, which is operated in a first addressing mode or in a second addressing mode, said process comprising:

(a) detecting an insertion event when a peripheral device is inserted into said information processing system;

(b) giving priority, in response to the insertion event, to a device driver of said first addressing mode in ascertaining whether said device driver can operate said peripheral device;

(c) said device driver requesting, when a response at said step (b) is affirmative, allocation of system resources to said inserted peripheral device;

(d) allocating, in response to a request at said step (c), said system resources for said inserted peripheral device;

(e) giving chance, in response to the insertion event, to a device driver of said second addressing mode in ascertaining whether said device driver can operate said peripheral device if said peripheral device is not enabled by said device driver of said first addressing mode;

(f) said device driver requesting, when a response at said step (e) is affirmative, allocation of system resources to said inserted peripheral device; and (g) allocating, in response to a request at said step (f), said system resources for said inserted peripheral device.

11. A computer programmable storage device in which physically stored is a computer program for executing a process for automatically enabling a PC card on a computer system, which is operated in a 16-bit mode or in a 32-bit mode, said process comprising:

(a) detecting an insertion event when a PC card is inserted into said information processing system;

(b) giving priority, in response to the insertion event, to a device driver of said 16-bit mode in ascertaining whether said device driver can operate said PC card;

(c) said device driver requesting, when a response at said step (b) is affirmative, allocation of system resources to said inserted PC card;

(d) allocating, in response to a request at said step (c), said system resources for said inserted PC card;

(e) giving chance, in response to the insertion event, to a device driver of said 32-bit mode in ascertaining whether said device driver can operate said PC card if said PC card is not enabled by said device driver of said 16-bit mode;

(f) said device driver requesting, when a response at said step (e) is affirmative, allocation of system resources to said inserted PC card; and (g) allocating, in response to a request at said step (f), said system resources for said inserted PC card.

12. A computer programmable storage device in which physically stored is a computer program for executing a process for automatically enabling a PC card on a computer system, which has a plurality of device drivers for a 32-bit mode and for a 16-bit mode, said process comprising:

(a) detecting an insertion event when a PC card is inserted into said information processing system;

(b) giving priority, in response to the insertion event, to a device driver of said 16-bit mode in ascertaining whether said device driver can operate said PC card;

(c) said device driver requesting, when a response at said step (b) is affirmative, allocation of system resources to said inserted PC card;

(d) allocating, in response to a request at said step (c), said system resources for said inserted PC card;

(e) giving chance, in response to the insertion event, to a device driver of said 32-bit mode in ascertaining whether said device driver can operate said PC card if said PC card is not enabled by said device driver of said 16-bit mode;

(f) said device driver requesting, when a response at said step (e) is affirmative, allocation of system resources to said inserted PC card; and (g) allocating, in response to a request at said step (f), said system resources for said insertion PC card.

13. A computer programmable storage device in which physically stored is a computer program for executing a process for automatically enabling a peripheral device on a computer system, which is operated in a first addressing mode or in a second addressing mode, said process comprising:

(a) detecting an insertion event when a peripheral device is inserted into said information processing system;

(b) giving priority, in response to the insertion event, to a device driver of said first addressing mode in enabling said peripheral device;

(c) initiating said first address mode device driver;

(d) detecting for peripheral device enablement by said first address mode device driver; and (e) giving chance, in response to the insertion event, to a device driver of said second addressing mode in enabling said peripheral device if said inserted device is not enabled by any device drivers of the first addressing mode.

14. A computer programmable storage device in which physically stored is a computer program for executing a process for automatically enabling a PC card on a computer system, which is operated in a 16-bit mode or in a 32-bit mode, said process comprising:

(a) detecting an insertion event when a PC card is inserted into said information processing system;

(b) giving priority, in response to the insertion event, to a device driver of said 16-bit mode in enabling said PC card;

(c) initiating said 16-bit mode device driver;

(d) detecting for PC card enablement by said 16-bit mode device driver; and (e) giving chance, in response to the insertion event, to a device driver of said 32-bit mode in enabling said PC card if said PC card is not enabled by any device drivers of said 16-bit mode.

15. A computer programmable storage device in which physically stored is a computer program for executing a process for automatically enabling a PC card on a computer system, which has a plurality of device drivers for a 32-bit mode and for a 16-bit mode, said process comprising:

(a) detecting an insertion event when a PC card is inserted into said information processing system;

(b) giving priority, in response to the insertion event, to a device driver of said 16-bit mode in enabling said PC card;

(c) successively initiating multiple 16-bit mode device drivers;

(d) detecting for PC card enablement with each successive 16-bit mode device driver; and (e) giving chance, in response to the insertion event, to a device driver of said 32-bit mode in enabling said PC card if said PC card is not enabled by any device drivers of said 16-bit mode.

* * * * *